United States Patent [19]

Pezzani

[11] Patent Number: 5,422,777
[45] Date of Patent: Jun. 6, 1995

[54] LOW CAPACITANCE PROTECTION CIRCUIT FOR TELEPHONE EQUIPMENT

[75] Inventor: Robert Pezzani, Vouvray, France

[73] Assignee: SGS-Thomson Microelectronics, S.A., Gentilly, France

[21] Appl. No.: 110,450

[22] Filed: Aug. 23, 1993

Related U.S. Application Data

[63] Continuation of Ser. No. 802,979, Dec. 6, 1991.

[30] Foreign Application Priority Data

Dec. 7, 1990 [FR] France ................. 90 15641

[51] Int. Cl.$^6$ ............ H02H 3/20; H02H 9/04
[52] U.S. Cl. ................................ 361/56; 361/91; 361/111; 361/118
[58] Field of Search ............. 361/56, 118, 91, 111

[56] References Cited

U.S. PATENT DOCUMENTS 4,282,555 8/1981 Svedberg ....................... 361/56

FOREIGN PATENT DOCUMENTS 2225908 11/1988 United Kingdom .......... H02H 9/04

Primary Examiner—Marc S. Hoff
Assistant Examiner—S. Jackson
Attorney, Agent, or Firm—Robert Groover

[57] ABSTRACT

An overvoltage protection circuit comprises three protection components (21, 22, 23) connected by their first terminal to a common point (C) and by their second terminal to a first conductor (A), second conductor (B) and ground, respectively. Each protection component comprises the anti-parallel association of a protection component (T1, T2, T3) and a diode (D1, D2, D3), the common point being connected to a same polarity terminal of each protection component. In case one of the conductors exhibits, at the normal state, a polarization difference higher than the other with respect to ground, the cathodes or anodes of the protection components are connected to the common point according as the higher polarized conductor is negative or positive with respect to ground.

33 Claims, 2 Drawing Sheets

LOW CAPACITANCE PROTECTION CIRCUIT FOR TELEPHONE EQUIPMENT

This is a continuation of Ser. No. 802,979, filed on Dec. 6, 1991.

BACKGROUND OF THE INVENTION

The present invention relates to the field of overvoltage protection circuits for lines such as telephone lines.

Among the known overvoltage protection circuits, circuits of the type shown in FIG. 1A are now frequently adopted, wherein protection is ensured by two bidirectional components P1, P2 connected between each conductor and ground, each component having the electrical characteristics shown in FIG. 1B. When overvoltage occurs on one of the conductors, the protection components goes from a blocked state (high impedance) to a conductive state (low impedance) thus shorting the conductor with ground. However, in standby state (high impedance) each of the two components withstands the conductor/ground voltage. Usual voltage values are $-48$ V for one conductor and about 0 V for the other. This voltage asymmetry generates (as explained later on) a capacitance asymmetry of the components. This asymmetry, permissible for usual networks, is a major impediment for some digital network lines.

Other protection circuits have been proposed, amongst others the one of FIG. 2, wherein three unidirectional protection units 1, 2 and 3 are connected between a common point C and a first conductor A, a second conductor B and ground G. Each protection component comprises in anti-parallel arrangement an unidirectional protection component T and a diode D, respectively $T_1$, $D_1$; $T_2$, $D_2$; $T_3$, $D_3$. In FIG. 2, the cathodes of diodes $D_1$, $D_2$, $D_3$ are interconnected and the anodes of the protection components $T_1$, $T_2$, $T_3$ are interconnected.

Such a structure is for example described in U.S. Pat. No. 4,282,555.

The protection components $T_1$, $T_2$, $T_3$ are, for example, gateless thyristors which become conductive from their anode to their cathode when the voltage across their terminals exceeds a threshold value predetermined during manufacturing. However, it is possible to choose other known protection components, for example, components of the avalanche diode type or thyristors, the gate of which receives a bias signal, which is insufficient to render them conductive but sufficient to adjust their breakdown threshold between main terminals.

An advantage of this structure, when the protection components $T_1$ are gateless thyristors, is that it is easily integrable on two, or even one, chips.

The invention relates more particularly to the capacitive behavior of circuits of the type shown in FIGS. 1 and 2.

The thyristor-type components, or more generally other types of unidirectional protection components, generally have a substantial capacitance between their main electrodes. This capacitance is well above that of conventional diodes such as diodes $D_1$, $D_2$ and $D_3$. Since the diodes are arranged in parallel with the protection components, the influence of their own capacitance can be neglected.

Thus, the provision of protection components changes the capacitance between each conductor A or B and ground G. This is unimportant when the lines are intended to carry low frequency electrical current or telephone signals, but becomes a major drawback when the lines carry digital signals corresponding to binary transitions between two states, the transitions having to be as steep as possible. In that case, the presence of relatively high parasitic capacitances, and especially a capacitance dissymmetry between the conductors, is a major drawback. These capacitances cause distortion of signals and may even render them indiscernible.

Indeed, although the circuit of FIG. 2 is symmetrical as regards the suppression of overvoltages on either conductor A or B, it is asymmetrical as regards its capacitive behavior. This asymmetry has been more particularly noted in the case indicated as preferred in the above patent, namely, the protection of telephone lines.

In the prior art, to avoid this problem, it has been necessary to use symmetrical protection structures both for the protection function and for the capacitive behavior. An example of such a structure is shown in FIG. 3. In this structure, three diodes D11, D12, D13 are connected by their cathodes to a first terminal of a bidirectional overvoltage-triggered protection component T10, the three diodes being connected by their cathodes to conductor A, conductor B and ground G, respectively. Three additional diodes D14, D15, D16 are connected by their anodes to the second terminal of component T10 and by their cathodes to conductor A, conductor B and ground, respectively. With this structure, whatever the polarization of conductors A and B with respect to ground, component T10 has the same capacitance and, moreover, this capacitance is low because T10 is in a biased state. The drawback of this structure is the difficulty encountered, on the one hand, for manufacturing a bidirectional overvoltage-triggered component that is really symmetrical and, on the other, for integrating the overall structure as a monolithic component.

Despite this drawback, the type of structure shown in FIG. 3 is used when conductors A and B are intended to transmit digital signals.

SUMMARY OF THE INVENTION

An object of the invention is to enable the use of a structure of the type shown in FIG. 2 when a line with asymmetrically biased conductors is to be protected while keeping the advantage of obtaining a low capacitance between each conductor and ground, the capacitance value between each conductor and ground being roughly the same.

To achieve this object, the applicant has studied the reasons for high and asymmetric capacitances in circuits such as those shown in FIG. 3. It is to be noted that this study does not appear in the prior art patent. Up to now, those skilled in the art have only noticed that, in case of a configuration as shown in FIG. 2 used in telephony, a high capacitive asymmetry appears and they have proposed, to solve the problem, to use the circuit of FIG. 3.

According to the invention, it is provided to slightly change the circuit shown in FIG. 2 for obtaining a decrease and balance of capacitances.

More particularly, the invention provides an overvoltage protection circuit, arranged between a first conductor, a second conductor and ground, comprising three protection components connected by their first terminal to a common point and by their second terminal to the first conductor, second conductor and ground, respectively. Each protection component comprises the anti-parallel association of an unidirectional overvoltage-triggered protection component and a diode, the common point being connected to a terminal of a given polarity of each protection component. When one of the conductors exhibits at a normal state a bias voltage magnitude, with respect to ground, higher than the other, the cathodes of the protection components are connected to the common point if the more heavily biased conductor is biased negatively with respect to ground, and the anodes of the protection components are connected to the common point if the more heavily biased conductor is biased positively with respect to ground.

According to an embodiment of the invention, each protection component is a gateless thyristor.

The invention more particularly relates to the protection of telephone lines wherein one of the conductors is negatively biased and the other is biased substantially at the ground potential.

BRIEF DESCRIPTION OF THE DRAWINGS

The foregoing and other objects, features and advantages of the invention will be apparent from the following detailed description of preferred embodiments as illustrated in the accompanying figures wherein.

DETAILED DESCRIPTION OF THE INVENTION

Figure 1A:
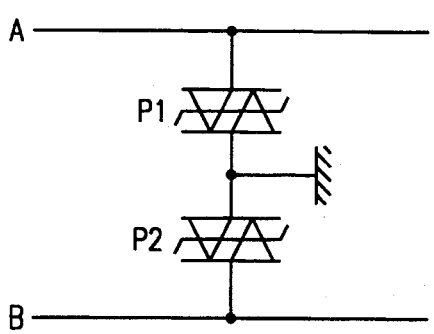
FIGS. 1A and 1B show a known protection circuit and the current-voltage curve of a component used in this circuit.
Figure 1B:
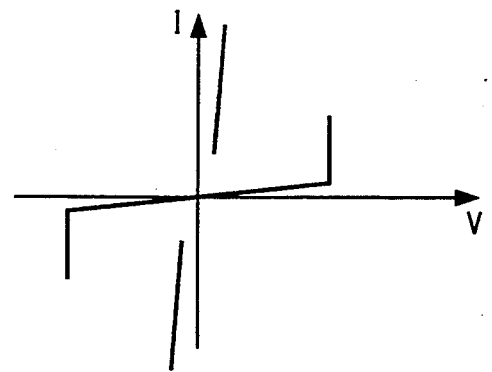
Figure 2:
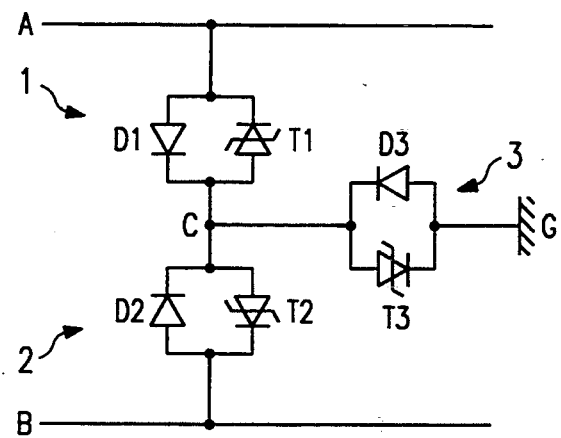
FIG. 2 shows a known protection circuit.
Figure 3:
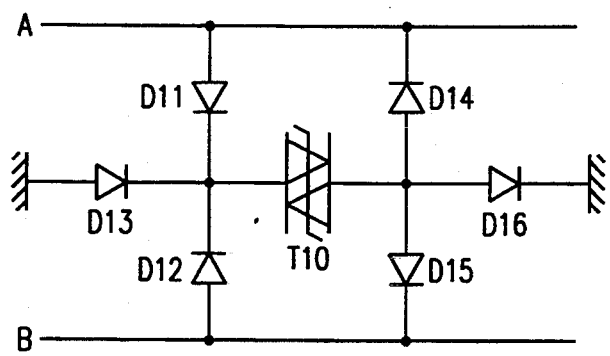
FIG. 3 shows a conventional protection circuit used to reduce capacitive problems.

Before explaining the invention, the capacitive behavior of the circuit shown in FIG. 2 will be considered in the case of the protection of a telephone line.

Figure 4:
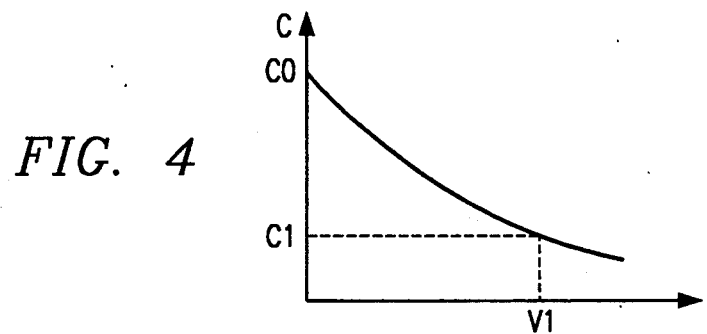
FIG. 4 is a capacitance curve as a function of the polarization voltage for a protection component and is intended to explain the capacitive behavior of the circuit of FIG. 2 and of the circuit according to the invention.

As shown in FIG. 4, the capacitance of a protection component depends greatly upon its bias voltage: capacitance decreases as bias voltage increases. Thus, the capacitance of a component T will have a value $C_0$ for a zero bias and a lower value $C_1$ for a bias $V_1$. To simplify the description, it will be assumed that $C_1=C_0/4$.

For implementation in telephone lines, the present standards impose that one of the conductors, for example conductor A, is polarized at a negative voltage $-V_1$ while conductor B is substantially at the ground potential conductor B may be considered to be connected to ground through a very high value impedance). In that case, due to biasing of diode D2, the common point C will be substantially at the same potential as conductor B (ground). Hence, the protection component T1 is biased by a voltage $V_1$ whereas the protection components T2 and T3 are not biased. Referring back to the above exemplary values, the equivalent capacitance between conductor A and ground, $C_{AG}$, will be roughly $C_0/5$ while the equivalent capacitance $C_{BG}$ between conductor B and ground will only be about $C_0/2$.

Thus, there is a non-negligible capacitance between conductor B and ground, and a very sharp unbalance as regards the respective capacitance between each conductor and the ground.

Figure 5:
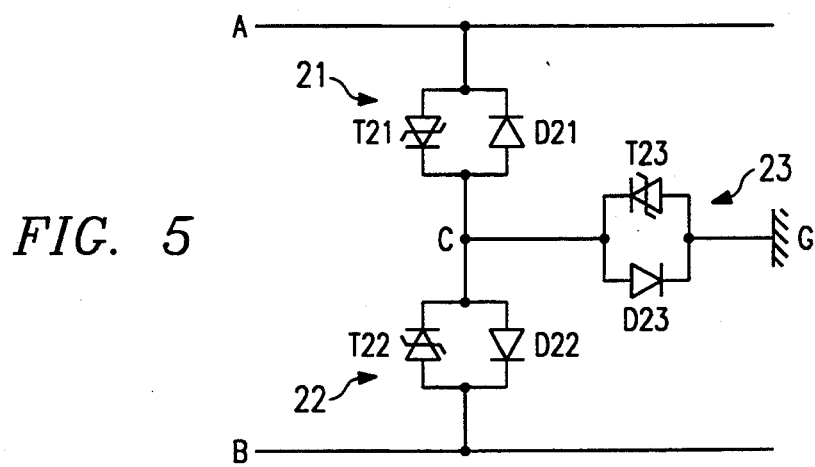
FIG. 5 schematically shows a protection circuit according to the invention.

FIG. 5 shows a protection component according to the invention adapted to operate in case one of the conductors, for example conductor A, is at a negative voltage with respect to ground ($V_1 = -48$ V for conventional telephone lines), and the other conductor is substantially at the ground potential (not directly grounded, but being considered as being connected to ground by a very high value impedance).

Protection units 21, 22, 23, each comprising a protection component T and a diode D associated in anti-parallel arrangement therewith are connected with a reverse polarity with respect to the case of FIG. 2, namely, the cathodes of the protection elements T21, T22, T23 are connected to the common point C instead of the anodes.

With this circuit, due to the bias of diodes D21 and D22, point C is at a $-48$ V potential and not 0 V as in the case of FIG. 2. Hence the protection component T23 is biased at the higher voltage (48 V), and will have a decreased capacitance which is in series with the capacitance of component T21 or T22. It is therefore ensured that the capacitance between the conductor and ground will be lower than the capacitance of component T23 biased at the highest circuit voltage. Taking the same example as in the case of FIG. 2, the following equivalent capacitances between conductors and ground will be obtained:

$$C_{AG}=C_0/5 \text{ and } C_{BG}=C_0/8,$$

instead of $C_{AG}=C_0/5$ and $C_{BG}=C_0/2$ in case of FIG. 2.

In practice, it has been noticed that the capacitance of a protection component of the gateless thyristor-type was, with no bias, about 350 picofarads and, at a bias of 48 V, about 100 picofarads. Then, a capacitance $C_{AG}$ of 77 pF and a capacitance $C_{BG}$ of 50 pF are obtained whereas, in the case of the circuit of FIG. 2, values of 77 and 175 pF, respectively, would have been obtained.

It is to be pointed out again that the specific example considered in connection with FIGS. 2 and 5 corresponds to the case most usually encountered in practice when it is desired to protect the telephone lines liable to carry digital signals and that, in the prior art, the circuit diagram shown in FIG. 2 has been proposed. In spite of the small apparent difference between the circuits of FIGS. 2 and 5, the balance of the capacitances is greatly improved.

Figure 6:
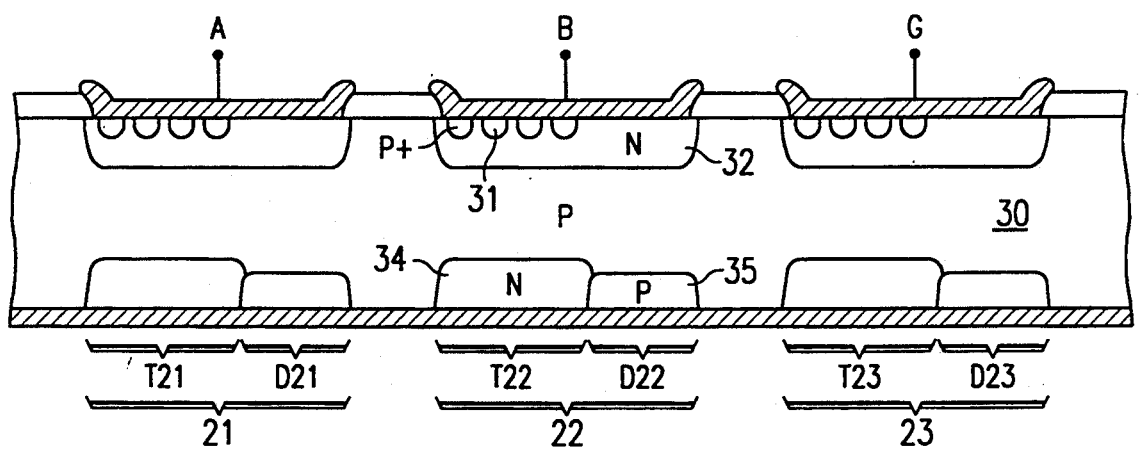
FIG. 6 shows a monolithic embodiment of the circuit of FIG. 5.

FIG. 6 shows by way of example an embodiment as a monolithic implementation of the circuit of FIG. 5. An assembly of components 21, 22, 23 is formed in a P-type silicon layer 30. A protection component T comprises P+-type 31, N-type 32, P-type 30 and N-type 34 successive regions. The corresponding diode is formed by the same N region 32, the same P substrate region 30, and an overdoped P-type region 35. According to an aspect of the invention, it will be noted that no diffusion isolation is provided between components 21, 22, 23. Indeed, these diffusions which are conventionally used, for example in the structure shown in FIG. 7 of the above U.S. Pat. No. 4,282,555, are useless. The provision of such lateral diffusions is in practice a rule for integrated circuit designers. The reason is to force the current to flow through the rear face electrode and to limit lateral currents in the substrate. Lateral currents may be dangerous if they generate hot points and a reduced resistance of components. This preconception has proven to be unfounded because the low or high level electrical current spontaneously flows through the least resistive path (and not through the shortest path) and thereby spontaneously flows towards the rear face electrodes, whether there is a lateral isolation diffusion or not.

The invention is susceptible to various modifications which will appear to those skilled in the art. Especially, the protection components $T_1$, $T_2$, $T_3$ which have been described as gateless thyristors can be any other components ensuring an equivalent protection function. Moreover, the invention generally relates to a method for connecting a protection circuit while decreasing spurious capacitances. For example, the circuit of FIG. 2 will be suitable for protecting two conductors, one of which is substantially at the ground potential and the other is at a positive potential (which is not the case for standard telephone lines).

I claim:

1. An overvoltage protection circuit, arranged between a first conductor, a second conductor, and ground, comprising:

first, second, and third protection units all connected by their respective first terminals to a common point, and by their respective second terminals to said first conductor, to said second conductor, and to ground, respectively, each said protection unit comprising the anti-parallel combination of a unidirectional overvoltage-triggered protection component and a diode, said first terminal of each said protection unit being connected to the ANODE of said respective diode, and said second terminals of each said protection unit being connected to the CATHODE of said respective diode;

each said unidirectional overvoltage-triggered protection component having a capacitance which decreases as the reverse bias voltage thereon increases;

wherein said first conductor is expected to exhibit, under normal operating conditions, a bias with respect to ground which is of larger magnitude than that of said second conductor;

whereby said third protection unit is biased to reduce the capacitance thereof, and the capacitances to ground from said first and second conductors are therefore reduced, and more nearly balanced, than if said protection units were connected with the opposite orientation.

2. The protection circuit of claim 1, wherein each said protection component is a gateless thyristor.

3. The protection circuit of claim 1, configured for connection to telephone lines in which one of the conductors is negatively polarized and the other conductor is substantially polarized at ground potential.

4. The circuit of claim 1, wherein said first conductivity type is P-type.

5. The circuit of claim 1, wherein said first, second, and third protection units are all identical.

6. The circuit of claim 1, wherein each said protection unit comprises a gateless thyristor structure.

7. An overvoltage protection circuit, for connection to a first conductor having a negative bias of tens of Volts, to a second conductor having a bias potential of much smaller or zero magnitude, and to a ground connection, comprising:

first, second, and third protection units, each comprising a semiconductor structure
      which turns on, to provide a very-low-impedance path for electrons from a first terminal thereof to a second terminal thereof, whenever the potential of said second terminal rises to exceed the potential of said first terminal by at least a predetermined firing voltage,
      and which turns on, to provide conduction for electrons from said second terminal thereof to said first terminal thereof, whenever the potential of said first terminal exceeds the potential of said second terminal by at least a second predetermined amount,
      and which provides a capacitance, between said first and second terminals thereof, which is reduced as the potential of said first terminal exceeds the potential of said second terminal;
   wherein said first terminals of said three protection units are all connected together,
   and wherein said second terminals of said three protection units are connected respectively to said first conductor, to said second conductor, and to ground;
   wherein said protection components have a bias-dependent capacitance, and are connected with a polarity which biases said third protection unit to reduce the capacitance thereof;
   whereby said protection units provide a reduced and more balanced capacitance from said first and second conductors to ground.

8. The circuit of claim 7, wherein said first conductivity type is P-type.

9. The circuit of claim 7, wherein said first, second, and third protection units are all identical.

10. The circuit of claim 7, wherein each said protection unit comprises a gateless thyristor structure.

11. The circuit of claim 7, wherein each said protection unit comprises a first N-type region at said second terminal and a P-type region at said first terminal, said N-type and P-type regions forming a junction therebetween; and further comprising a second P-type region, at said second terminal, which is totally surrounded by said first N-type region, and a second N-type region, at said first terminal, which is totally surrounded by said first P-type region.

12. An overvoltage protection circuit, for connection to a first conductor having a negative bias of tens of Volts, to a second conductor having a bias potential of much smaller or zero magnitude, and to a ground connection, comprising:

first, second, and third protection units, each comprising a semiconductor structure which provides conduction from a first terminal thereof to a second terminal thereof at a first threshold voltage, and from said second terminal to said terminal at a second threshold voltage which is larger in magnitude than the magnitude of said first threshold voltage, and which provides a capacitance between said first and second terminals which is reduced as the potential of said first terminal exceeds the potential of said second terminal;
   wherein said second terminals of said first, second, and third protection units are connected respectively to said first conductor, to said second conductor, and to ground;
   and wherein said first terminals of said three protection units are all connected together, to a common node which is held to a potential which is below ground and close to that of said first conductor;

whereby said third protection unit is biased to reduce the capacitance thereof, and the capacitances to ground from said first and second conductors are therefore reduced and more nearly equalized.

13. The circuit of claim 12, wherein said first conductivity type is P-type.

14. The circuit of claim 12, wherein said first, second, and third protection units are all identical.

15. The circuit of claim 12, wherein each said protection unit comprises a gateless thyristor structure.

16. The circuit of claim 12, wherein each said protection unit comprises a first N-type region at said second terminal and a P-type region at said first terminal, said N-type and P-type regions forming a junction therebetween; and further comprising a second P-type region, at said second terminal, which is totally surrounded by said first N-type region, and a second N-type region, at said first terminal, which is totally surrounded by said first P-type region.

17. A solid-state overvoltage protection device, for connection to a first conductor having a negative bias of tens of Volts, to a second conductor having a bias potential of much smaller or zero magnitude, and to a ground connection, comprising:
a substantially flat monolithic body of P-type semiconductor material;
first, second, and third instances of a first diffusion structure, on a first surface of said body, including
an N-type diffusion extending to said first surface,
a plurality of P-type diffusions within said N-type diffusion, and
a respective contact structure making ohmic contact to said plurality of P-type diffusions and to said N-type diffusion;
said respective contact structure of said first, second and third instances being connected to said first conductor, said second conductor, and to ground, respectively;
first, second, and third instances of a second diffusion structure, on a second surface of said body, including
an N-type diffusion extending to said second surface, and
a contact structure making ohmic contact to said N-type diffusions of each said instance of said second diffusion structure, and to said body of P-type material;
wherein said first, second, and third instances of said first diffusion structure are aligned with said first, second, and third instances of said second diffusion structure;
and wherein no lateral isolation is provided between said first, second, and third instances of said first diffusion structure, nor between said first, second, and third instances of said second diffusion structure.

18. The device of claim 17, wherein said second diffusion structure also includes a P-type diffusion extending to said second surface.

19. The device of claim 17, wherein said first, second, and third instances of said first diffusion structure are all identical.

20. The device of claim 17, wherein said first, second, and third instances of said first diffusion structure are all identical, and said first, second, and third instances of said second diffusion structure are all identical.

21. The device of claim 17, wherein said first, second, and third instances of said second diffusion structure are all identical.

22. A solid-state overvoltage protection device, comprising:
a substantially flat monolithic body of semiconductor material of a first conductivity type;
first, second, and third instances of a first diffusion structure, on a first surface of said body, including
a second-conductivity-type diffusion extending to said first surface,
a plurality of first-conductivity-type diffusions, all within said second-conductivity-type diffusion, and
a respective contact structure making ohmic contact to said plurality of first-conductivity-type diffusions and to said second-conductivity-type diffusion;
first, second, and third instances of a second diffusion structure, on a second surface of said body, including
a second-conductivity-type diffusion extending to said second surface, and
a common contact structure making ohmic contact to said N-type diffusions of each said instance of said second diffusion structure, and to said body of P-type material;
wherein said first, second, and third instances of said first diffusion structure are aligned with said first, second, and third instances of said second diffusion structure;
and wherein no lateral isolation is provided between said first, second, and third instances of said first diffusion structure, nor between said first, second, and third instances of said second diffusion structure.

23. The device of claim 22, wherein said first conductivity type is P-type.

24. The device of claim 22, wherein said second diffusion structure also includes a first-conductivity-type diffusion extending to said second surface.

25. The device of claim 22, wherein said first, second, and third instances of said first diffusion structure are all identical.

26. The device of claim 22, wherein said first, second, and third instances of said first diffusion structure are all identical, and said first, second, and third instances of said second diffusion structure are all identical.

27. The device of claim 22, wherein said first, second, and third instances of said second diffusion structure are all identical.

28. An overvoltage protection circuit, for connection to a first conductor having a negative bias of tens of Volts, to a second conductor having a bias potential of much smaller or zero magnitude, and to a ground connection, comprising:
first, second, and third protection units within a common body of P-type semiconductor material, each comprising
a first terminal ohmically connected to an N-type region within said common body, and also operatively ohmically connected to said common body with no intervening junction, and
a second terminal ohmically connected to a P-type region within said common body, and also ohmically connected to a second N-type region within said common body which totally encloses said P-type region, said first and second N-type regions being separated from each other by said common body;

wherein said respective second terminals of said three protection units are connected respectively to ground, to said first conductor, and to said second conductor;

and wherein said first terminals of said three protection units are all connected together, to a common node which is held to a potential which is below ground and close to that of said first conductor.

29. The circuit of claim 28, wherein said first, second, and third protection units are all identical.

30. An overvoltage protection circuit, arranged between a first conductor, a second conductor, and ground, comprising:

first, second, and third protection units all connected by their respective first terminals to a common point, and by their respective second terminals to said first conductor, to said second conductor, and to ground, respectively, each said protection unit comprising a unidirectional overvoltage-triggered protection component;

each said unidirectional overvoltage-triggered protection component having a capacitance which decreases as the reverse bias voltage thereon is increased; and means for biasing said third protection unit to decrease the capacitance thereof;

whereby said first and second conductors have capacitance to ground which is reduced, and more nearly equal.

31. The circuit of claim 30, wherein said first, second, and third protection units are all identical.

32. The circuit of claim 30, wherein each said protection component is a gateless thyristor.

33. The circuit of claim 30, configured for connection to telephone lines in which one of the conductors is negatively biased and the other conductor is biased substantially at ground potential.

* * * * *